(12) United States Patent
Kawamura et al.

(10) Patent No.: US 8,498,351 B2
(45) Date of Patent: Jul. 30, 2013

(54) TRANSMISSION APPARATUS AND RECEPTION APPARATUS

(75) Inventors: Teruo Kawamura, Yokosuka (JP); Yoshihisa Kishiyama, Yokosuka (JP); Kenichi Higuchi, Saitama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/271,863

(22) Filed: Oct. 12, 2011

(65) Prior Publication Data

US 2012/0033632 A1    Feb. 9, 2012

Related U.S. Application Data

(63) Continuation of application No. 12/299,277, filed as application No. PCT/JP2007/058520 on Apr. 19, 2007.

(30) Foreign Application Priority Data

May 1, 2006    (JP) .................................. 2006-127996

(51) Int. Cl.
*H04W 72/04*    (2009.01)
*H04K 1/10*    (2006.01)

(52) U.S. Cl.
USPC ........... 375/260; 375/130; 375/135; 375/136; 375/295; 370/310; 370/342; 370/344; 455/61; 455/216

(58) Field of Classification Search
USPC .............. 375/130, 135, 136, 219, 240, 240.1, 375/240.11, 240.15, 240.24, 240.27, 241, 375/242, 316, 259–285, 295–315; 370/277, 370/294, 310, 340, 344, 342, 441; 455/427
See application file for complete search history.

(56) References Cited

U.S. PATENT DOCUMENTS

2002/0191578 A1*  12/2002  Bachl et al. ................... 370/342

FOREIGN PATENT DOCUMENTS

JP    2004-253899 A    9/2004

OTHER PUBLICATIONS

3GPP TR 25.814 V1.2.2, "Physical Layer Aspects for Evolved UTRA", Mar. 2006.*
LG Electronics, Uplink pilot for channel quality measurement, R1-060537 3GPP TSG RAN WG1 #44, Feb. 17, 2006, URL: http:l/www.3gpp.org/ftpltsg_ranIWG1_RL11TSGR/Docs/R1-O60537.zip.*
NTT DoCoMo, "Physical Channels and Multiplexing in Evolved UTRA Uplink," 3GPP TSG RAN WG1 Ad Hoc LTE, Jun. 21, 2005, R1-050591, 20 pages.

(Continued)

*Primary Examiner* — Shuwang Liu
*Assistant Examiner* — Ross Varndell
(74) *Attorney, Agent, or Firm* — Osha Liang LLP

(57) ABSTRACT

A transmission apparatus used in a mobile communication system adopting a single carrier scheme in an uplink includes: multiplexing means configured to multiplex a pilot channel, a control channel, and a data channel; and transmission means configured to transmit a transmission symbol including at least the pilot channel and the control channel using the uplink. A first pilot channel used for a reception apparatus to measure channel state of the uplink is transmitted using a frequency band over a plurality of resource blocks. A second pilot channel for compensating for a channel transmitted by the uplink is transmitted by a resource block assigned to the transmission apparatus. Control channels of the transmission apparatus and the apparatus other than the transmission apparatus are orthogonalized with each other by a FDM scheme.

10 Claims, 12 Drawing Sheets

OTHER PUBLICATIONS

NTT DoCoMo, NEC, Sharp, "Orthogonal Pilot Channel in the Same Node B in Evolved UTRA Uplink," 3GPP TSG-RAN WG1 #42 on LTE, Sep. 2, 2005, R1-050851, 8 pages.

NTT DoCoMo, Fujitsu, Mitsubishi Electric, SHARP, "Radio Parameter Set for Single-Carrier Based Radio Access in Evolved UTRA Uplink," 3GPP TSG RAN WG1 Ad Hoc on LTE, Jun. 21, 2005, R1-050588, 21 pages.

NTT DoCoMo, "Uplink Multiple Access Scheme for Evolved UTRA," 3GPP TSG RAN WG1 Meeting #40bis, Apr. 8, 2005, R1-050248, 7pages.

3GPP TR 25.814 V1.2.2, Mar. 2006, "Physical Layer Aspects for Evolved UTRA", 104 pages.

Written Opinion issued in PCT/JP2007/058520, mailed on Jul. 24, 2007, 3 pages.

International Search Report issued in PCT/JP2007/058520, mailed on Jul. 24, 2007, with translation, 5 pages.

LG Electronics, Uplink pilot for channel quality measurement, R1-060537 3GPP TSG RAN WG1 #44, Feb. 17, 2006, URL: http://www.3gpp.org/ftp/tsg_ran/WG1_RL1/TSGR/Docs/R1-060537.zip.

Motorola, E-UTRA Uplink Control Channel Design and TP, R1-060403, Feb. 17, 2006, URL: http://www.3gpp.org/ftp/tsg_ran/WG1_RL1/TSGR1_44/Docs/R1-060403.zip.

Japanese Office Action for Application No. 2006-127996, mailed on Jan. 5, 2010 (5 pages).

Taiwanese Office Action for Application No. 096114592, mailed on Feb. 24, 2011 (10 pages).

NTT DOCOMO, Fujitsu, NEC, Sharp: "Channel-Dependent Scheduling Method for Single-Carrier FDMA Radio Access in Evolved UTRA Uplink", R1-050701, 3GPP TS GRAN WG1_42 on LTE, Aug. 29-Sep. 2, 2005.

\* cited by examiner

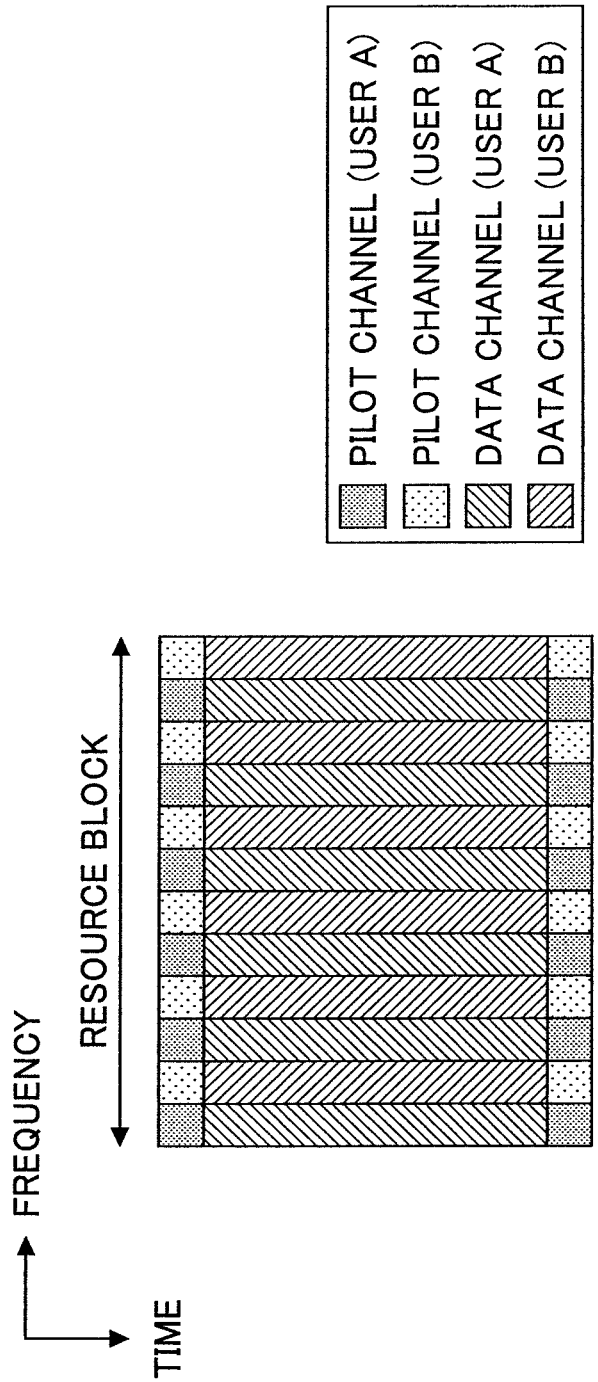

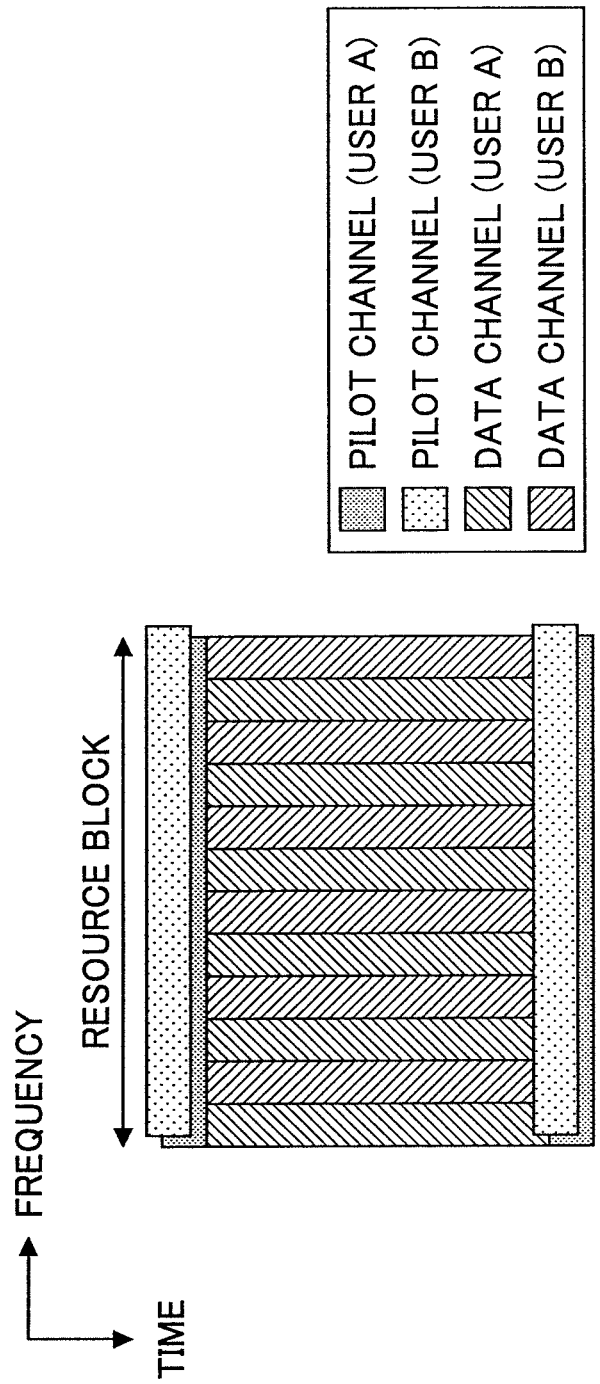

TRANSMISSION APPARATUS AND RECEPTION APPARATUS

CROSS-REFERENCE TO RELATED APPLICATIONS

The present application is a Continuation and claims benefit, pursuant to 35 U.S.C. §120, to U.S. patent application Ser. No. 12/299,277, filed Oct. 31, 2008. That application is hereby incorporated by reference in its entirety.

TECHNICAL FIELD

The present invention relates to a technical field of radio communications. More particularly, the present invention relates to a transmission apparatus and a reception apparatus used in a downlink.

BACKGROUND ART

In a next generation radio access scheme for which research and development are currently being conducted, it is required to perform communication more efficiently compared with conventional schemes. In the downlink, speed-up and increase of capacity for communication are especially required. Thus, radio access schemes of a multicarrier scheme such as orthogonal frequency division multiplexing (OFDM) are highly expected. On the other hand, the uplink is different from the downlink in that speed-up and large capacity are not so strongly required for the uplink as the downlink and that transmission power of a mobile station is considerably limited compared with that of the base station and the like. Thus, the multicarrier scheme in which there is a fear that peak to average power ratio (PAPR) becomes large is not a proper scheme for the uplink. Rather, from the viewpoint of suppressing PAPR and increasing coverage of a cell, it is desirable to adopt a single carrier scheme for the uplink.

By the way, there are data channels, control channels and pilot channels and the like as channels to be transmitted on the uplink, and the channels include various types of channels having different functions. For example, as to the pilot channels, in addition to a pilot channel for channel compensation for assigned radio resources, there is a pilot channel for channel compensation for unassigned radio resources. In addition, the control channel may include information such as transmission confirmation information (ACK/NACK) of a previously received downlink data channel and the like in addition to information (for example, information indicating a modulation scheme and a channel coding rate and the like) used for demodulating an uplink data channel. For example, the patent document 1 describes types and properties of the uplink channels.

[Non-patent document 1] 3GPP, TR25.814, "Physical Layer Aspects for Evolved UTRA"

DISCLOSURE OF THE INVENTION

Problem to be Solved by the Invention

However, a proper uplink frame considering properties of the above-mentioned various uplink channels has not yet been established. In addition, in the next generation radio access scheme, wide range of system frequency bands are prepared and it is assumed that mobile stations perform communications using the whole or a part of the bands. However, an uplink frame suitable for use in various wide and narrow bands has not yet been established.

The present invention is contrived for addressing at least one of the problems, and the object is to provide a transmission apparatus and a reception apparatus for realizing a proper uplink frame for transmitting various uplink channels.

Means for Solving the Problem

In the present invention, a transmission apparatus used in a mobile communication system adopting a single carrier scheme in an uplink is used. The transmission apparatus includes: multiplexing means configured to multiplex a pilot channel, a control channel, and a data channel; and transmission means configured to transmit a transmission symbol including at least the pilot channel and the control channel using the uplink. The pilot channel includes a first pilot channel used for a reception apparatus to measure channel state of the uplink and a second pilot channel for compensating for a channel transmitted by the uplink. The data channel is transmitted using one or more resource blocks. The first pilot channel is transmitted using a frequency band over a plurality of resource blocks. The second pilot channel is transmitted by a resource block assigned to the transmission apparatus. Control channels of the transmission apparatus and the apparatus other than the transmission apparatus are orthogonalized with each other by a frequency division multiplexing (FDM) scheme.

Effect of the Invention

According to the present invention, a proper uplink frame for transmitting various uplink channels can be realized.

BRIEF DESCRIPTION OF THE DRAWINGS

FIG. 5A is a diagram showing a manner in which information of a user A and information of a user B are multiplexed by the distributed FDM;

FIG. 5B is a diagram showing a manner in which information of a user A and information of a user B are multiplexed by CDM and the distributed FDM;

DESCRIPTION OF REFERENCE SIGNS

Figure 1:
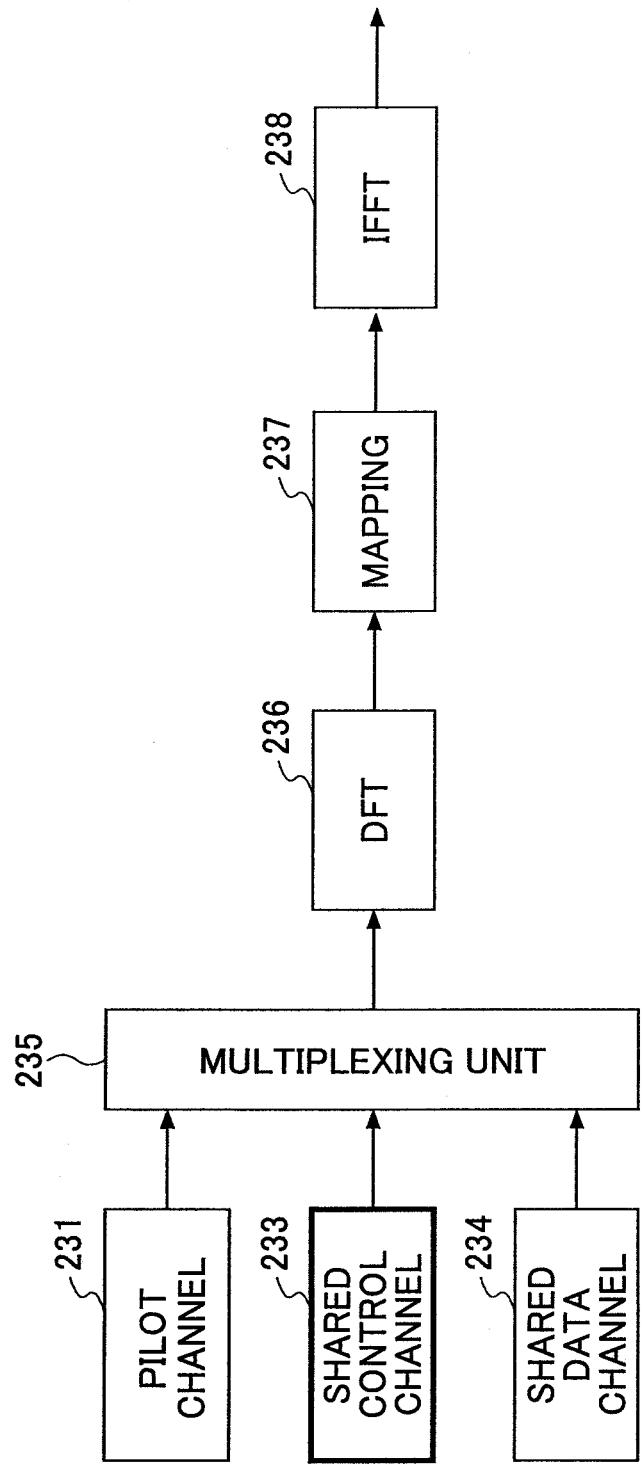
FIG. 1 is a schematic block diagram of a transmitter according to an embodiment of the present invention.

231 pilot channel generation unit
233 shared control channel generation unit
235 shared data channel generation unit 236, 241 discrete Fourier transform unit
237, 242 mapping unit
238, 243 inverse fast Fourier transform unit
244 demultiplexing unit
251-253 switch
255-258 modulation and coding unit
259 multiplexing unit

PREFERRED EMBODIMENTS FOR CARRYING OUT THE INVENTION

According to an embodiment of the present invention, a first pilot channel used for a reception apparatus to measure channel state of the uplink is transmitted by a wide band, and a second pilot channel for compensating for a channel transmitted by the uplink is transmitted by a resource block assigned to the user apparatus. Thus, quality measurement for each resource block can be properly performed, and channel compensation and the like for assigned resource blocks can be also properly performed.

In addition to obtaining frequency diversity effect, in view of obtaining orthogonality easily and with reliability, control channels of the transmission apparatus and the apparatus other than the transmission apparatus may orthogonalized with each other by a distributed FDM scheme.

From the viewpoint of transmitting a control channel by a resource block in a good channel state, it is desirable that the control channel of the transmission apparatus is also transmitted in a resource block assigned for data channel of the transmission apparatus.

From the viewpoint of especially expecting frequency diversity effect, the control channel of the transmission apparatus may be transmitted using not only the resource block for the data channel but also a wide band equal to or greater than the resource block assigned for the data channel of the transmission apparatus.

From the viewpoint of improving throughput considering superiority and inferiority of channel state of each user, the control channel of the transmission apparatus may be transmitted using a frequency band of one or several number of resource blocks.

Data channels of the transmission apparatus and the apparatus other than the transmission apparatus may be orthogonalized with each other by the FDM scheme, and pilot channels of the transmission apparatus and the apparatus other than the transmission apparatus may be orthogonalized with each other by the CDM scheme.

Embodiment 1

Before describing the apparatus configuration and the operation according to an embodiment of the present invention, it can be considered meaningful to explain the outline of various types of channels transmitted on the uplink. Uplink channels are broadly divided into (A) Contention-based channels, (B) Contention non-permitted channels and (C) Pilot channels. The contention-based channel is a channel for which scheduling is not required in a base station before transmission, and the contention non-permitted channel is a channel (scheduled channel) for which scheduling is required in a base station before transmission. The contention-based channel includes one or more of (A1) High speed access channel, (A2) Reservation channel and (A3) Uplink synchronization channel. The contention non-permitted channel includes one or more of (B1) uplink shared data channel and (B2) uplink shared control channel.

(A) [Contention-Based Channel]

The contention-based channel to be transmitted from the mobile station without scheduling in the base station can be transmitted at any time by a mobile station (more generally, user apparatus (UE: user equipment) that includes a fixed station). It is desirable that the contention-based channel is transmitted over a wide band. By doing that, transmission time can be decreased. In addition, since the band is wide, frequency diversity effect can be obtained. Thus, even though signal quality deteriorates very much in a part of frequencies, power amplification (power ramping) and the like for compensating for the deterioration is not essential. Although contention may occur between users for the contention-based channel, high speed communication is available easily by the channel. Although time division multiplexing scheme (TDM) is used in the same way as the current UTRA, frequency division multiplexing and/or code division multiplexing (CDM) is performed in the present embodiment from the viewpoint of reducing contention with other users as much as possible. However, when contention against other user occurs, these users may transmit the contention-based channel again as necessary.

(A1) Fast Access Channel

The fast access channel may include a control message of a small data size, may include traffic data of a small data size, or may include both of them. One reason for limiting the data size to be small is for reducing transmission delay. For example, the control message may include information on layer 3 handover, for example. The traffic data of the small size may include an e-mail of a small information amount, a command of a game and the like. Since the user apparatus can transmit the fast access channel to the base station without any prior reservation, process time required for transmission can be small. The fast access channel is transmitted by one or more frequency chunks assigned beforehand. Which chunk is to be used in a plurality of frequency chunks may be reported from the base station to the user apparatus by a broadcast channel of a downlink. The content of the report may indicate that only a particular frequency chunk can be used or may indicate any one (or any number) of a plurality of particular frequency chunks can be used. The latter one is advantageous in that probability for contention between users is less than that of the former one.

(A2) Reservation Channel

The reservation channel includes information for requesting scheduling of a contention non-permitted channel. The information may include identification information for identifying a user apparatus, traffic data type (voice, image, and the like), data size, required quality information (QoS and the like), and transmission power of the user apparatus and the like. The reservation channel is also transmitted by a frequency chunk assigned beforehand. Which chunk is to be used in a plurality of frequency chunks may be reported from the base station to the user apparatus by a broadcast channel of a downlink.

(A3) Uplink Synchronization Channel

In the present embodiment, signal transmission of an uplink is performed using a single carrier scheme, and equalization is performed for suppressing multipath interference. For performing effective equalization, it is desirable to maintain synchronization such that reception timing for reception from various users fall within a period of a predetermined guard interval. For maintaining the synchronization, uplink synchronization channel is used.

By the way, maintaining synchronization can be also realized by the after-mentioned pilot cannel. Therefore, it is not essential to prepare both of the synchronization channel and the pilot channel.

(B) [Contention Non-Permitted Channel]

The contention non-permitted channel is transmitted from the user apparatus according to scheduling performed in the base station.

(B1) Uplink Shared Data Channel

The uplink shared data channel includes both or one of traffic data and a control message of layer 3. The control message may include information on handover, information necessary for retransmission control and the like. The uplink shared data channel is assigned one or more resource blocks (or chunks) according to scheduling in time domain or both of time and frequency domains. In this case, resource assignment is scheduled in the base station such that a user related to a better transmission route (channel) in the time domain or in both of the time and frequency domains can transmit packet in priority. The number of resource blocks to be assigned is determined depending on a data rate and a data size and the like to be transmitted by the user apparatus. When there are a plurality of users requesting only a relatively low data rate, one resource block may be shared by a plurality of users. However, when a traffic size of a user exceeds a predetermined size, one user may use the whole of the resource block. In addition, one user may use a plurality of resource blocks. When one resource block is shared by a plurality of users, multiplexing in some manner is performed such that channels of a plurality of users become orthogonal in the resource block. For example, localized FDM or distributed FDM may be performed in the resource block.

(B2) Uplink Shared Control Channel

Uplink shared control channel transmits a physical control message and a layer 2 control message (FFS). As to the uplink shared data channel, resource assignment is scheduled in the base station such that a user related to a better transmission route (channel) can transmit a packet in priority. However, as to the uplink shared control channel, scheduling depending on superiority or inferiority of channel state is not essential (however, some link adaptation may be performed for the shared control channel). The base station assigns resource blocks to each user apparatus to perform scheduling to avoid contention of shared control channels. As to the uplink shared control channel, the base station performs scheduling depending on the number of users. In order to maintain packet error rate to be low, it is desirable to perform transmission power control with high precision. In addition, it is desirable to obtain frequency diversity effect by transmitting the uplink shared control channel over a wide range of frequencies so as to increase quality of reception packets.

More particularly, the uplink shared control channel includes one or more of:

(1) control information related to a scheduled uplink shared data channel;

(2) control information related to a scheduled downlink shared data channel;

(3) control information for changing content of scheduling of the uplink shared data channel; and (4) control information for performing scheduling of a downlink shared data channel.

In these types of control information, (1) includes control information essential for demodulating the uplink shared data channel, and is essential control information that should associated with the uplink shared data channel. On the other hand, as to (2) and (4), it is not essential that they are associated with the uplink shared data channel, and they are control information (control information different from the essential control information) that are not necessarily associated with the uplink shared data channel. According to such classification method, the control information (3) related to change of scheduling content may be included in the essential control information, or may be included in control information different from the essential control information.

(1) The control information (essential control information) related to scheduled uplink shared data channel is transmitted being associated with an uplink shared data channel only when the uplink shared data channel is transmitted. This control information is also called an associated control channel, and may include information necessary for demodulating shared data channel (modulation scheme, channel coding rate and the like), transmission block size, information related to retransmission control, and the like, and may be represented with information amount of about 14 bits, for example. For example, the retransmission control information may include information indicating whether a packet transmitted by the uplink shared data channel is a retransmission packet or a new packet, information indicating use method of the retransmission packet, and the like. For example, data of the retransmission packet is the same as data of a previously transmitted packet (initial transmission data, for example) in a first use method, and data of the retransmission packet may be different from data of a previously transmitted packet in a second use method. In the latter case, packet combining can be performed with redundancy information of error correcting coding.

(2) The control information associated with the scheduled downlink shared data channel is transmitted to the base station only when a downlink shared data channel is transmitted from the base station and the downlink shared data channel is received by the user apparatus. This control information represents transmission confirmation information, that is, whether the packet is properly received on the downlink (ACK/NACK), and it can be represented by 1 bit in a simplest case.

(3) The control information for changing content of scheduling of the uplink shared data channel is transmitted for reporting a buffer size and/or transmission power of the user apparatus to the base station. This control information may be transmitted periodically or irregularly. For example, it mat be transmitted from the user apparatus at a time when the buffer size and/or the transmission power change. The base station may change the scheduling content according to such a status change of the user apparatus. The status of the buffer size and the transmission power may be represented using an information amount of about 10 bits, for example.

(4) Control information for performing scheduling for the downlink shared data channel is transmitted for reporting channel quality information (CQI: channel quality indicator) of the downlink to the base station. The CQI may be reception SIR measured by the user apparatus, for example. This information may be transmitted periodically or irregularly. For example, this information may be reported to the base station when the channel quality changes. This control information may be represented using an information amount of 5 bits, for example.

(C) [Pilot Channel]

The pilot channel is a signal having a pattern that is known beforehand in the transmission side and in the reception side, and it can also be referred to as a reference signal, a known signal, a training signal and the like.

The pilot channel can be transmitted from the user apparatus using the time division multiplexing (TDM), the frequency division multiplexing (FDM), code division multiplexing (CDM), or a combination of these. However, from the viewpoint of decreasing peak-to-average power ratio (PAPR), it is desirable to use a TDM scheme. By orthogonalizing a pilot channel and a data channel using the TDM scheme, the pilot channel can be correctly separated in the reception side, so that it contributes to improvement of channel estimation accuracy.

The pilot channel includes a first pilot channel for CQI measurement for every resource block that has a chance to be assigned to the user apparatus in the future, and includes a second pilot channel for channel compensation of a channel transmitted by a resource block that is currently assigned to the user apparatus. As mentioned later, the first pilot channel is transmitted by a wide band including all resource blocks and the second pilot channel is transmitted only by a particular resource block assigned to the user apparatus.

FIG. 1 is a schematic block diagram of a transmitter according to an embodiment of the present invention. The transmitter shown in the figure is typically provided in a user apparatus. FIG. 1 shows a pilot channel generation unit 231, a shared control channel generation unit 233, a shared data channel generation unit 234, a multiplexing unit 235, a discrete Fourier transform unit (DFT) 236, a mapping unit 237 and an inverse fast Fourier transform unit 238.

The pilot channel generation unit 231 generates a pilot channel used in the uplink. The pilot channel includes the above-mentioned first and the second pilot channels at least.

The shared control channel generation unit 233 generates a shared control channel that may include various control information. The shared control channel generation unit 233 is described with reference to FIG. 3 later.

The shared data channel generation unit 234 generates a shared data channel transmitted by the uplink.

The multiplexing unit 235 multiplexes and outputs one or more channels. It is not essential to multiplex all of the channels shown in the figure, and one or more channels are multiplexed as necessary. In the example shown in the figure, processing of time division multiplexing is performed by the multiplexing unit 235, and processing of assuagement to frequency components is performed by the mapping unit 237. Since scheduling for the time division multiplexed signal is performed based on an instruction by the base station, the signal is classified to the contention non-permitted channel.

Actually, a contention-based channel is also generated and is multiplexed and transmitted as necessary. But, for the sake of simplicity of explanation, this is not shown.

The discrete Fourier transform unit (DFT) 236 performs Fourier transform on a signal (signal after being multiplexed in the example shown in the figure) input to the unit. In this stage of the signal processing, since the signal is discrete digital values, discrete Fourier transform is performed. By doing that, a sequence of signals arranged in order of time is represented in the frequency domain.

The mapping unit 237 maps each signal component after Fourier transform to a predetermined subcarrier on the frequency domain. The frequency division multiplexing (FDM) scheme in this case may be a localized FDM scheme for assigning one continuous narrow band to one user or may be a distributed FDMA scheme for giving a spectrum in which a plurality of frequency components are arranged by being distributed at predetermined frequency intervals. The predetermined frequency intervals are regular intervals generally, but the predetermined frequency intervals may be irregular intervals. The mapping unit 237 performs mapping on the frequency axis by the localized FDM or by the distributed FDM.

The inverse fast Fourier transform unit 238 performs inverse fast Fourier transform on the signal components after mapping so as to output a sequence of signals arranged in order of time.

By the way, the distributed FDM may be realized by Variable Spreading and Chip Repetition Factors-CDM (VSCRF-CDM) scheme and the like.

Figure 2:
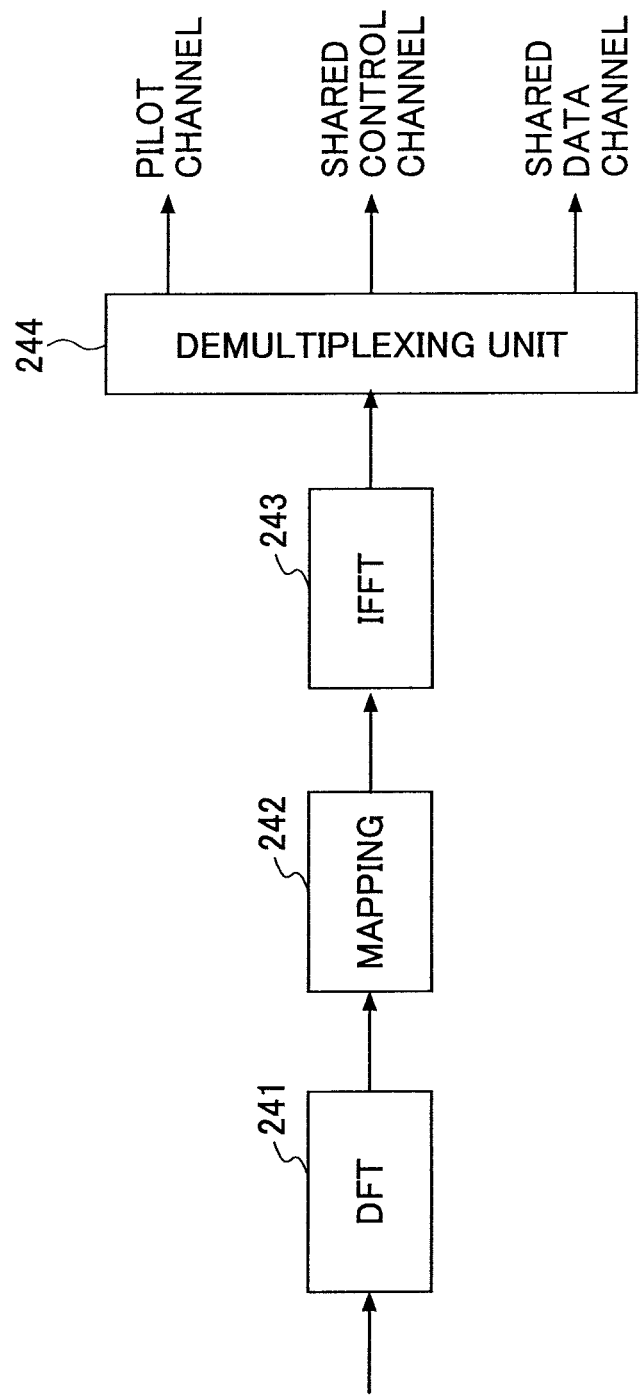
FIG. 2 is a schematic block diagram of a receiver according to an embodiment of the present invention.

FIG. 2 shows a schematic block diagram of a receiver according to an embodiment of the present invention. The receiver shown in the figure is provided in a base station typically. FIG. 2 shows a discrete Fourier transform unit (DFT) 241, a mapping unit 242, an inverse fast Fourier transform unit 243 and a multiplexing unit 244.

The discrete Fourier transform unit (DFT) 241 performs Fourier transform on a signal (reception signal in the example shown in the figure) input to the unit. Accordingly, a sequence of signals arranged in order of time can be represented in the frequency domain.

The mapping unit 242 extracts predetermined subcarrier components from signals after Fourier transform. Accordingly, signals that are multiplexed by the localized FDM or the distributed FDM are separated, for example.

The inverse fast Fourier transform unit 242 performs inverse fast Fourier transform on signal components after being separated to output a sequence of signals arranged in order of time.

The demultiplexing unit 244 separates one or more channels to output them. In the example shown in the figure, signals mapped to the frequency components are restored to signals before mapping by the demapping unit 242, and the separation of the time multiplexed signal is performed by the demultiplexing unit 244.

One or more channels generated in the generation unit of each channel are time-multiplexed (properly switched) by the multiplexing unit 235, and the multiplexed signal is input to the DFT 236 so that the signal is transformed to a signal in the frequency domain. The signal after transform is properly mapped to the frequency component by the mapping unit 237, and input to the IFFT 238 so as to be converted to time series signals. After that, the signal is transmitted by radio via process elements such as the RF unit shown in FIG. 1. This signal is received by the receiver shown in FIG. 2. The reception signal is input to the DFT 241, and is transformed into a signal in the frequency domain. The transformed signal is a signal mapped to the frequency component, and separated by the demapping unit 242 to a signal before mapping. The separated signal is transformed to time series signals, and the time-multiplexed signal sequence is properly demultiplexed by the demultiplexing unit 244, and further demodulation process and the like is performed by process elements not shown in the figure.

Figure 3:
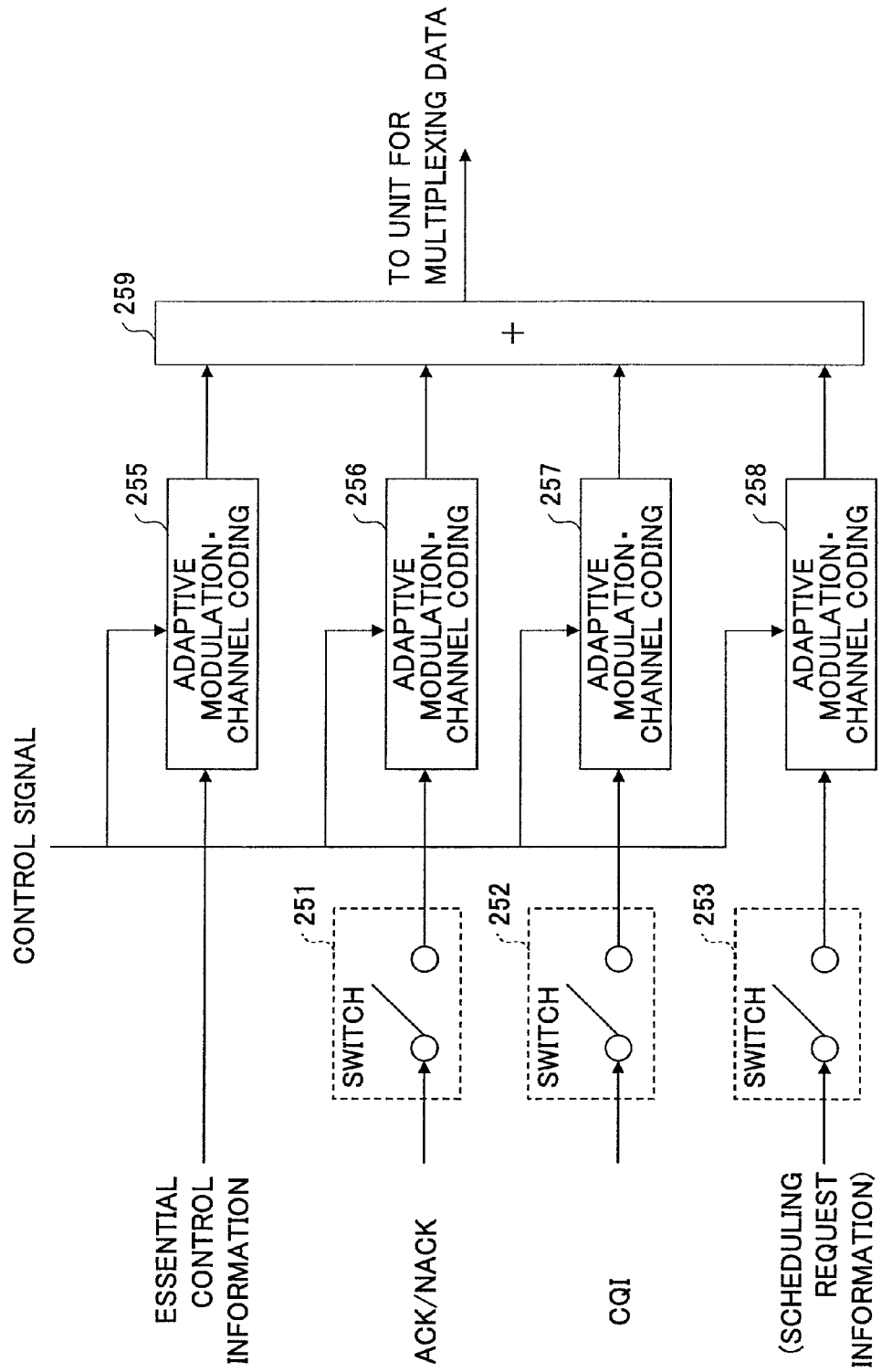
FIG. 3 shows a detailed diagram of the shared control channel generation unit.

FIG. 3 shows a detailed diagram of the shared control channel generation unit 233. FIG. 3 shows switches 251, 252 and 253, modulation and coding units 255, 256, 257 and 258, and a multiplexing unit 259. Each switch provides each channel that is input to one end (left side of the figure) to another end according to an instruction signal (not shown in the figure) on the shared control channel. The content of the instruction signal determines how to configure the shared control channel, that is, which control information is included in the shared control channel. In the example shown in the figure, the figure shows (1) essential control information, (2) transmission confirmation information of downlink channel (information indicating acknowledgement (ACK) and negative acknowledgement (NACK)), (3) information for changing content of scheduling and (4) channel state information (CQI) indicating reception quality of downlink pilot channel.

Each of the modulation and coding unit performs data modulation on a channel input to the unit using an instructed modulation scheme, and performs channel coding using an instructed coding scheme. The modulation scheme and the coding scheme used for each channel may be different or same schemes may be used for more than one channel. The modulation scheme or the coding scheme may be fixedly set so as to be unchanged.

The multiplexing unit 259 multiplexes each channel to generate and output the shared control channel.

In transmission of the shared control channel in the conventional technique, the modulation scheme and the coding scheme are fixed, and it is intended to obtain required quality by controlling transmission power control. However, in view of increasing quality of channel and effective use of resources, it is desirable to perform further link adaptation on transmission of the shared control channel. As a method for performing link adaptation, there are adaptive modulation and coding (AMC), and transmission power control (TPC).

Figure 4:
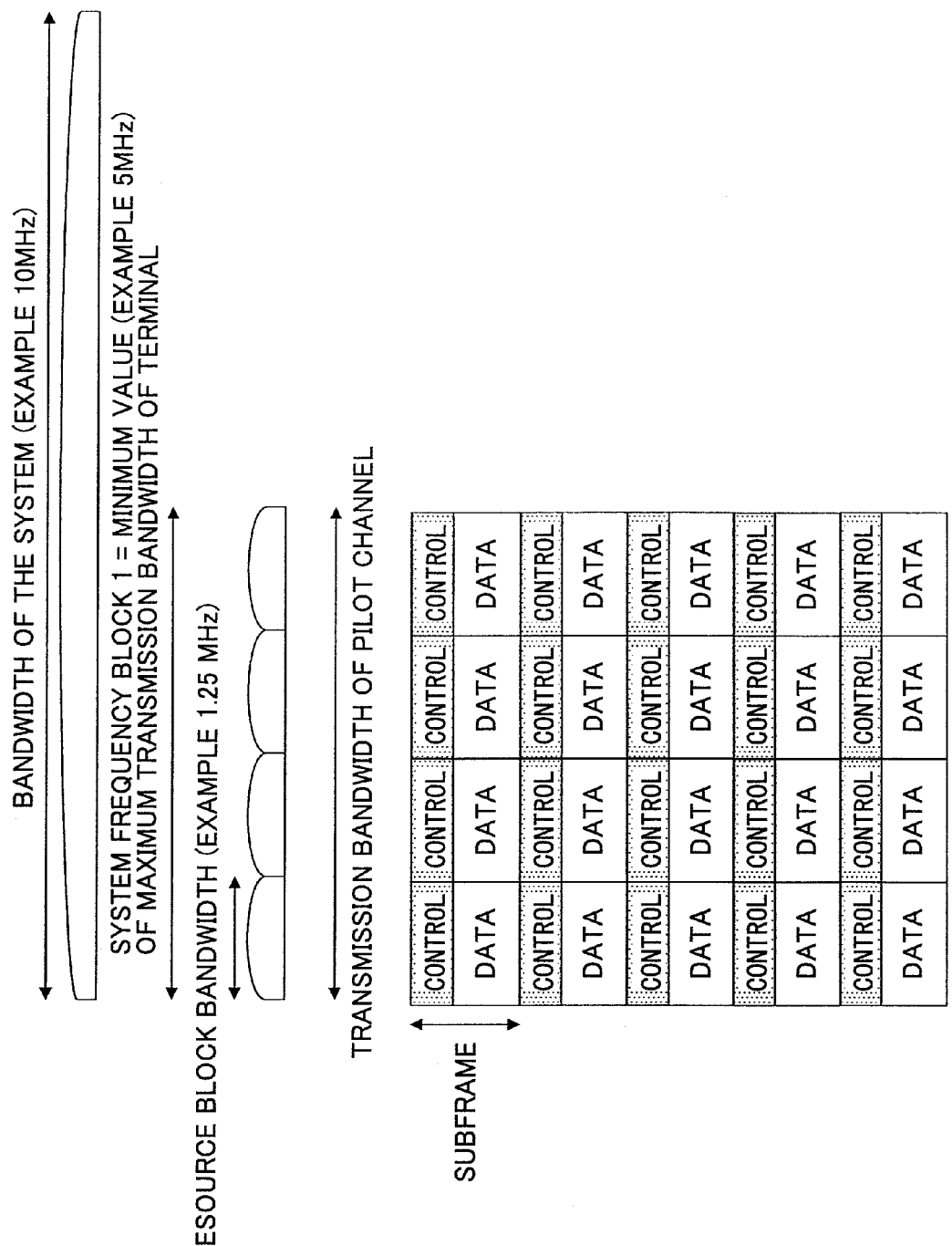
FIG. 4 is a diagram showing an example of bands used in a system.

FIG. 4 shows frequency bands used in the communication system. The frequency band provided to the system (to be also referred to as whole frequency band or system band) includes a plurality of system frequency blocks, so that the user apparatus can perform communication using one or more of resource blocks included in the system frequency blocks. The resource block is also called a chunk or a frequency chunk. In general, one chunk may include one or more carries (to be also referred to as a subcarrier). But, in an embodiment of the present invention, a single carrier scheme is adopted so that one chunk includes only one carrier.

In the example shown in FIG. 4, the system band is 10 MHz, the system frequency block is 5 MHz, and the system band includes two system frequency blocks. For the sake of simplicity of drawing, the system frequency band 2 is not shown. The resource block is 1.25 MHz, and one system frequency block includes four resource blocks. Which can be used in the two system frequency blocks by the user apparatus is determined by the base station based on a bandwidth by which the user apparatus can perform communication and a number of users performing communication in the system. The bandwidth of the system frequency block is designed as a band by which every user apparatus that may perform communication in the system can perform communication. In other words, the bandwidth of the system frequency block is determined as a maximum transmission bandwidth of a user apparatus of a minimum grade that can be assumed. Therefore, a user apparatus that can only perform communication using the band of 5 MHz is assigned only one of the system frequency blocks, but, a user apparatus that can perform communication using a band of 10 MHz may be assigned a band such that the user apparatus can use both of the system frequency blocks. In the present embodiment, although a subframe may be called a transmission time interval (TTI) such as 0.5 ms, for example, any proper interval may be used. These value examples are merely an example, and any proper values may be used.

The user apparatus transmits an uplink pilot channel to the base station. The base station determines (performs scheduling) one or more resource blocks to be used for the user apparatus to transmit the shared data channel based on the reception quality of the uplink pilot channel. The content of the scheduling (scheduling information) is reported to the user apparatus using an downlink shared control channel or other channel. The user apparatus transmits an uplink shared data channel using an assigned resource block. In this case, the shared control channel (shared control channel including essential control information) associated with the uplink shared data channel is transmitted using the same resource block. As mentioned above, the uplink shared control channel may include control information other than the essential control information.

Resource blocks assigned to a user may change as time advances. The resource blocks assigned to the user may comply with a frequency hopping pattern. The content of the hopping pattern may be known before start of communication between the base station and the user apparatus, and may be reported to the user apparatus from the base station as necessary. From the viewpoint for maintaining average signal quality of the uplink channel, it is desirable to use not only a particular resource block but also various resource blocks.

Figure 5C:
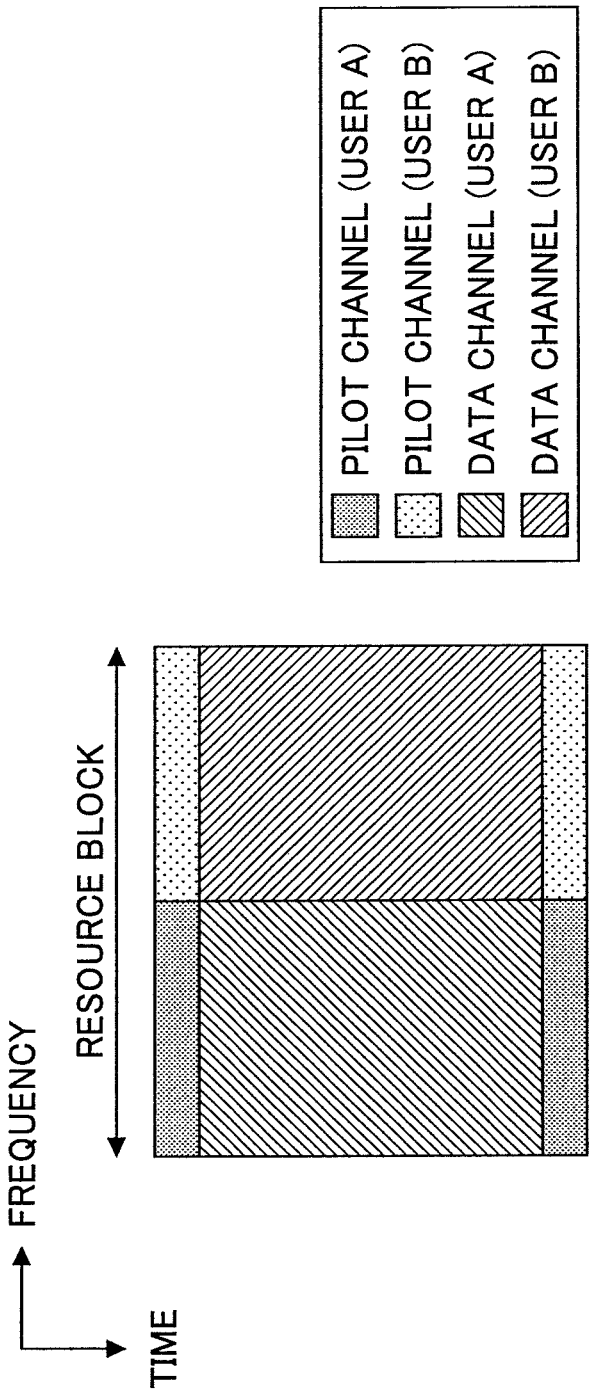
FIG. 5C is a diagram showing a manner in which information of a user A and information of a user B are multiplexed by the localized FDM.

FIGS. 5A-5C show detailed concrete examples how information of a user A and a user B are multiplexed in a subframe. In the example shown in FIG. 5A, pilot channels and data channels are time-multiplexed. Information of the user A and the user B are multiplexed using the distributed FDM. In the example of FIG. 5B, pilot channels and data channels are time-multiplexed and the data channels of the user A and the user B are multiplexed using the distributed FDM similarly to FIG. 5A, but the pilot channels of the user A and the user B are multiplexed by CDM. In the example of FIG. 5C, pilot channels and the data channels are time-multiplexed, and the data channels of the user A and the user B are multiplexed by the localized FDM.

Figure 6A:
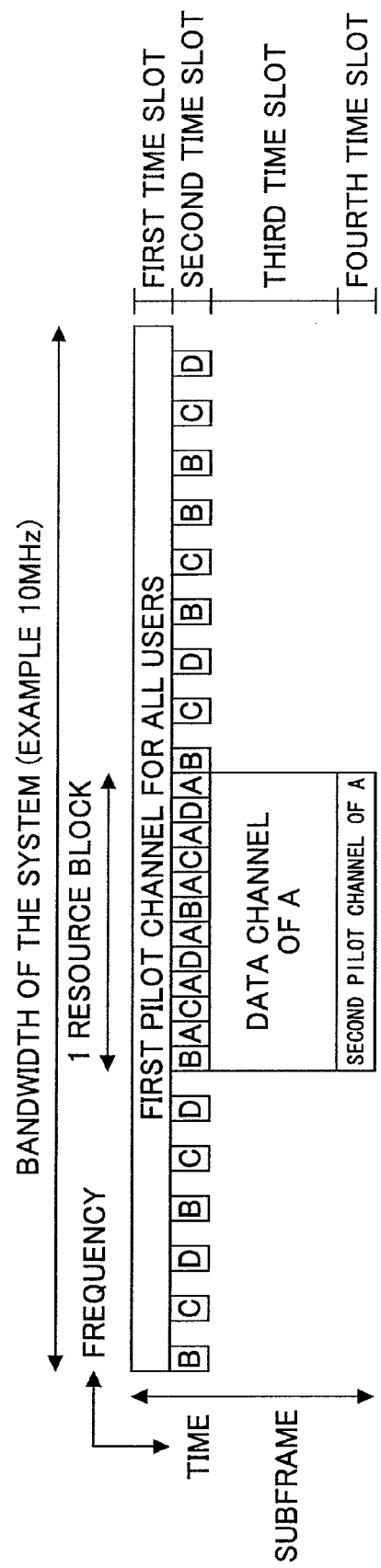
FIG. 6A is a diagram showing a mapping example of a pilot channel, a control channel, and a data channel.

FIG. 6A shows a mapping example of information of each user according to an embodiment of the present invention. Although the range shown in the figure is the whole frequency band and one subframe, the range in the frequency axis direction may be within a range of one system frequency block. For the sake of description, a period in a subframe is divided into first-fourth time slots in order of elapse of time. In the first time slot, first pilot channels from all users are multiplexed and transmitted. The all users include all of users that may transmit some channels in the future in addition to users transmitting the uplink data channel and users transmitting the uplink control channel. As mentioned above, the first pilot channel is a pilot channel for measuring CQI for all resource blocks having a chance to be assigned to the user apparatus in the future. Multiplexing of the first pilot channels for all users may be performed by FDM, CDM or both of them.

Control channels are mapped to the second time slot. Control channels of each user are orthogonalized with each other by the distributed FDM. As mentioned above, as information included in the shared control channel, there are essential control information essential for demodulating the shared data channel and control information (control information other than the essential control information) other than that. In the example shown in the figure, users B, C and D transmit control channels including control information other than essential control information. Like the first pilot channel, the users B, C and D distribute the control channels over the whole frequency band (or the whole of the system frequency block) to transmit them to the base station. It is assumed that the users B, C and D do not transmit a data channel in any resource block in this subframe. The user A is assigned one resource block, and the user A transmits a data channel in the third time slot using the resource block. A control channel (including essential control information and control information other than that) of the user A is transmitted using frequencies in the resource block assigned to the user A. The control channel of the user A and control channels of other users are orthogonalized with each other using the distributed FDM.

In the fourth time slot, the second pilot channel is mapped. As mentioned above, the second pilot channel is a pilot channel for channel compensation for a channel to be transmitted by a resource block that is currently assigned to the user apparatus. Also in this fourth time slot, first pilot channels transmitted over wide band for CQI measurement may be multiplexed and transmitted by a plurality of users. Also in this case, it is possible to perform channel compensation for a channel transmitted using the resource block currently assigned to the user apparatus by using a part of the first pilot channel transmitted over the wide band.

By the way, for the sake of simplicity of the drawing, although any data channel of users other than the user A is not shown, data channels and the like of some sort of users (other than the users B, C and D) are mapped to resource blocks other than the resource block assigned to the user A in actuality.

As to an uplink channel received from the user A, the base station estimates the channel state of the resource block based on the second pilot channel, and determines compensation content (phase rotation amount and power and the like) to be performed on the control channel and the data channel so as to perform the compensation. In addition, it is determined which resource block becomes high quality for the user A in later subframes based on the first pilot channel. The base station performs retransmission control and the like based on uplink channels (control information other than the essential control information) received from the users B, C and D. In addition, when resource assignment request of an uplink has been received, the base station determines which resource block becomes high quality for the user B, C or D based on the received first pilot channel.

From the viewpoint that the base station determines superiority or inferiority of the channel state of each user for each resource block, it is desirable that the first pilot channel is transmitted using a wide band. From the viewpoint of maintaining minimum reception quality in the base station by increasing frequency diversity effect, it is desirable that control channels of the users B, C and D for which any particular resource block is not assigned are distributed to a wide band like the example shown in the figure. From the viewpoint of transmitting a control channel in a good channel state as much as possible, it is desirable that the control channel of the user A to which a particular resource block is assigned is transmitted by the assigned resource block as the example shown in the figure. In this case, the second pilot channel transmitted by the assigned resource block can be also used for demodulation of the control channel of the user A.

Figure 6B:
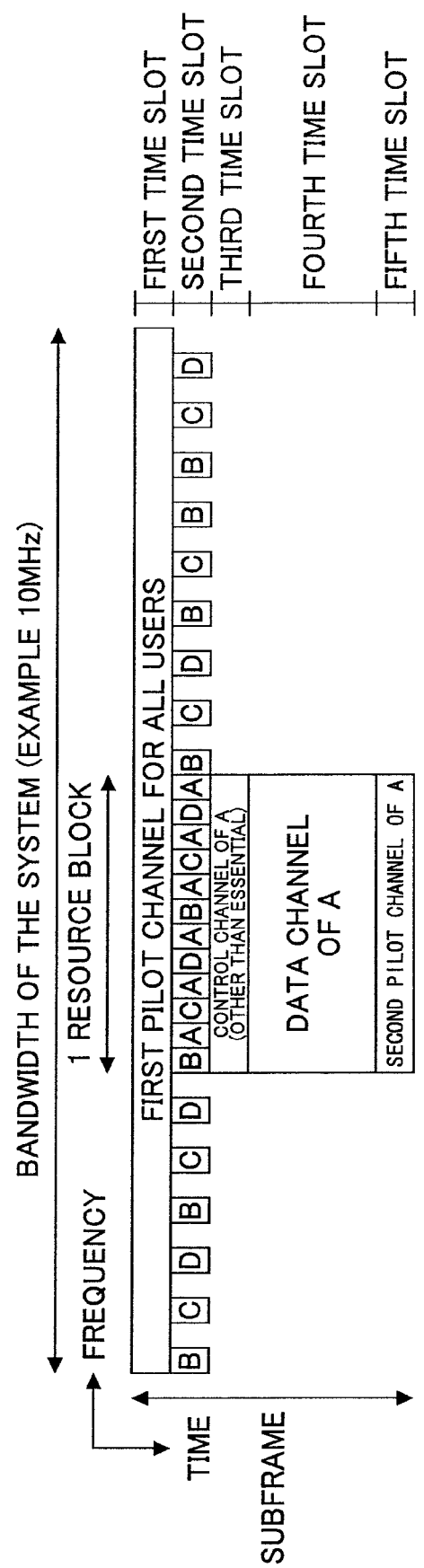
FIG. 6B is a diagram showing a mapping example of a pilot channel, a control channel, and a data channel.

FIG. 6B shows a mapping example of information of each user according to an embodiment of the present invention. Expedient time slots are divided to five that are first to fifth slots. The firs, second, fourth and fifth time slots are the same as the first to fourth time slots of FIG. 6A. However, in FIG. 6B, a control channel that includes control information other than the essential control information of user A is transmitted in the third time slot (before the data channel of the user A is transmitted). In the example shown in the figure, in control channels of the user A, the essential control information is transmitted by the second time slot, and control information other than the essential control information is transmitted by the third time slot. Such a scheme is advantageous when information amount of control information other than the essential control information is large (for example, when control information other than the essential control information is large to a degree in which it is difficult to transmit using the scheme shown in FIG. 6A).

Figure 7:
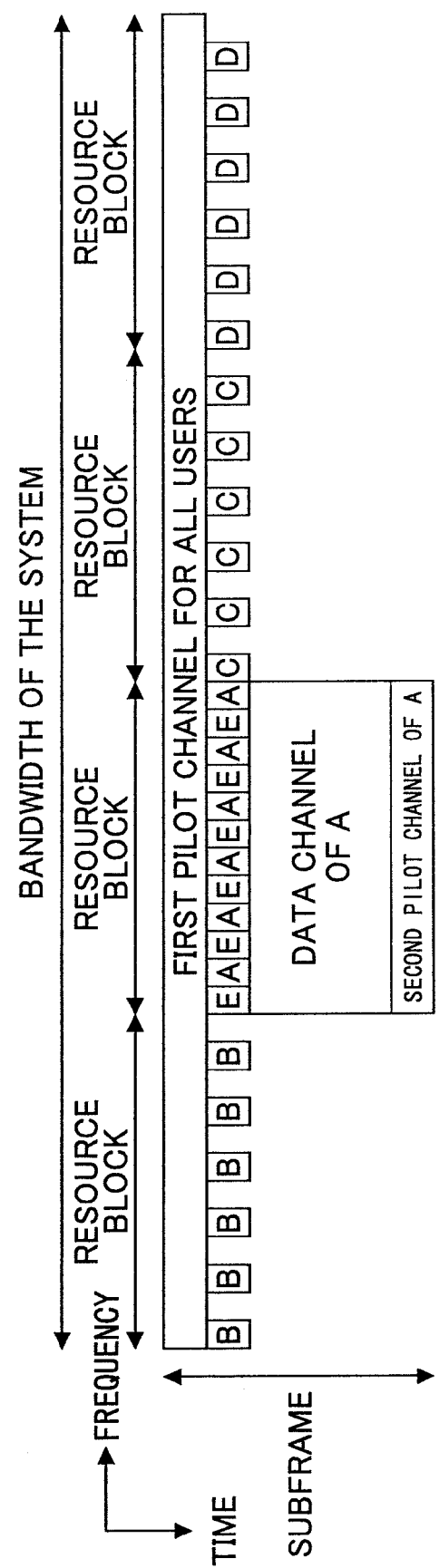
FIG. 7 is a diagram showing a mapping example of a pilot channel, a control channel, and a data channel.

FIG. 7 shows a mapping example of information of each user according to an embodiment of the present invention. Generally, although this example is similar to the example shown in FIG. 6A, this example is deferent in that each of the control channels (including only control information other than essential control information) transmitted by the users B, C and D falls within a range of a resource block instead of being distributed over the whole frequency band. When a channel state on a particular resource block is relatively good, it is desirable that the control channel is transmitted by a particular resource block as shown in FIG. 7.

Figure 8:
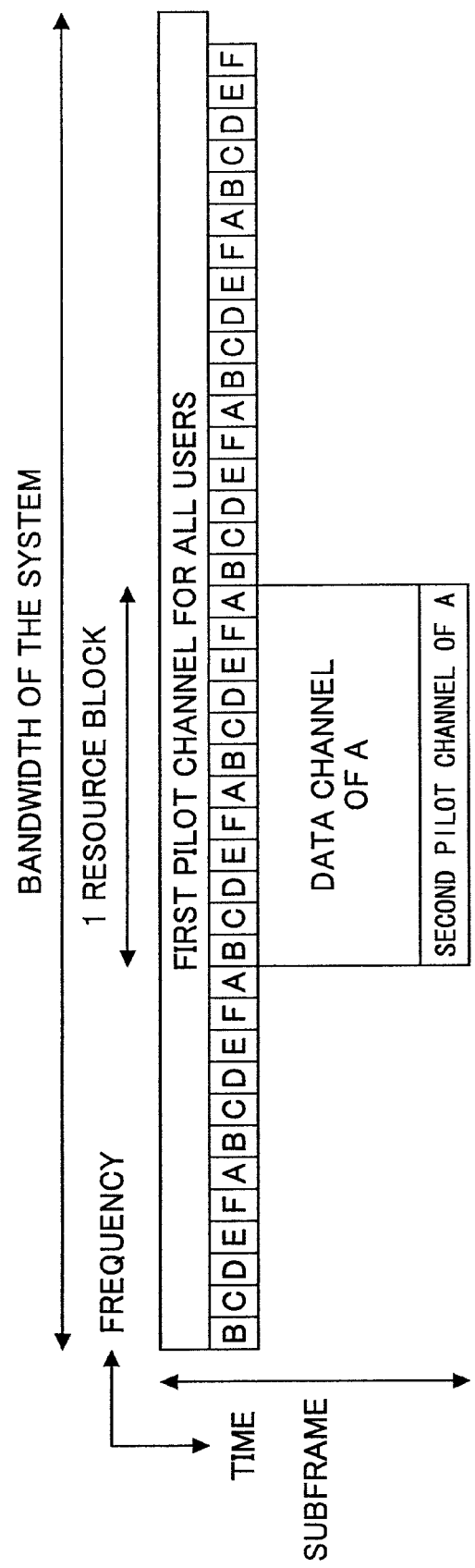
FIG. 8 is a diagram showing a mapping example of a pilot channel, a control channel, and a data channel.

FIG. 8 shows a mapping example of information of each user according to an embodiment of the present invention. Generally, although this example is similar to the example shown in FIG. 6A, this example is deferent in that not only the control channels (including only control information other than essential control information) transmitted by the users B, C and D but also the control channel of the user A are distributed over the whole frequency band.

Figure 9:
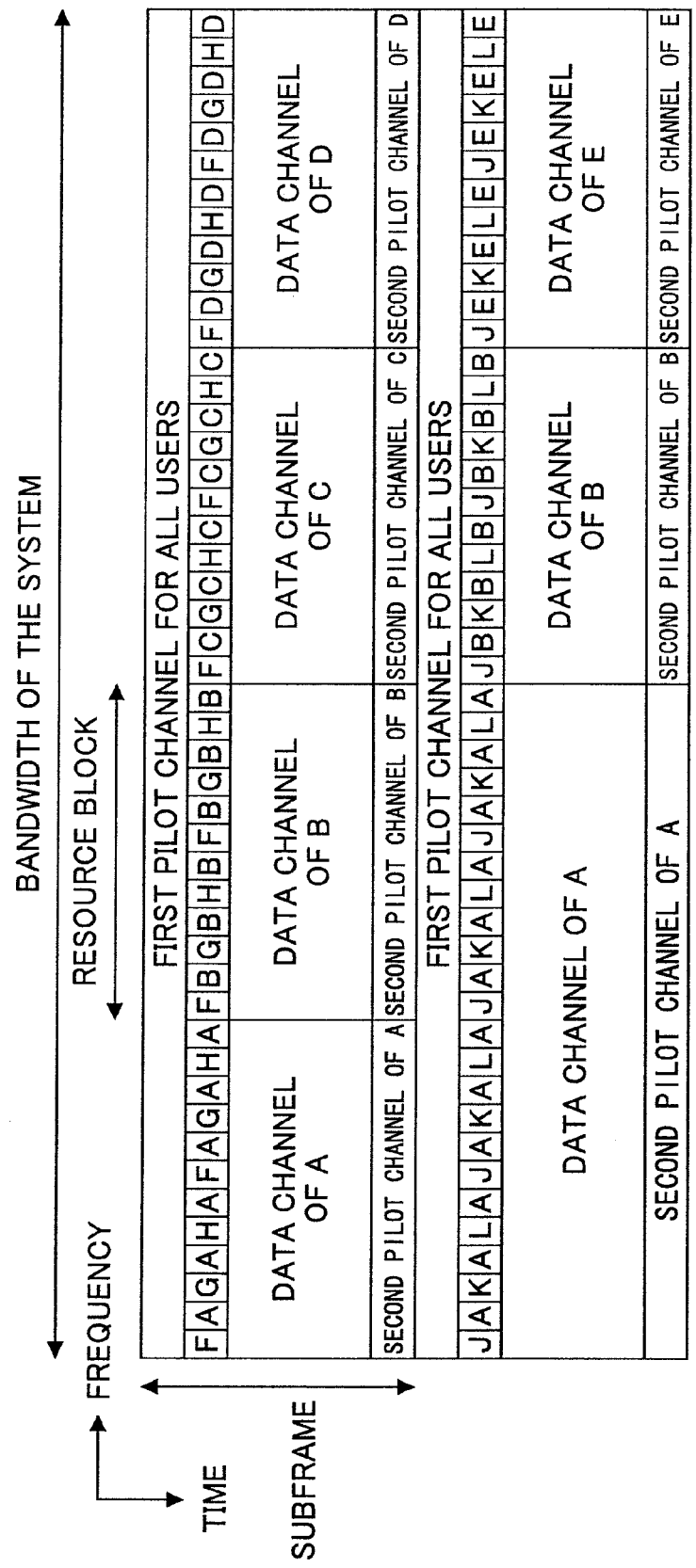
FIG. 9 is a diagram showing a mapping example of a pilot channel, a control channel, and a data channel.

FIG. 9 shows a mapping example of information of each user according to an embodiment of the present invention. Although only the data channel of user A is shown in the mapping examples of FIGS. 6A-8, data channels of other users are shown in FIG. 9. FIG. 9 shows a mapping example for two subframes. As shown in the figure, mapping methods may change variously as time advances.

The present international application claims priority based on Japanese patent application No. 2006-127996, filed in the JPO on May 1, 2006 and the entire contents of the Japanese patent application No. 2006-127996 is incorporated herein by reference.

The invention claimed is:

1. A base station for use in a mobile communication system in which a single carrier scheme is adopted in uplink and a system band is divided by a plurality of resource blocks, the base station comprising:
   a receiving unit configured to receive a signal that includes a data channel, a first pilot channel that is not related to the data channel, a second pilot channel that is related to the data channel, and a control channel; and
   a process unit configured to process the data channel, the first pilot channel, the second pilot channel and the control channel that are included in the signal received by the receiving unit,
   wherein, in the signal received by the receiving unit, the first pilot channel is mapped to a plurality of resource blocks, and the second pilot channel is mapped to a resource block the same as a resource block to which the data channel is mapped, and the control channel is mapped to the resource block to which the data channel is mapped when the control channel and the data channel are mapped to the same subframe and the control channel is mapped to distributed resource blocks when the control channel and the data channel are not mapped to the same subframe.

2. The base station as claimed in claim 1, wherein, in the signal received by the receiving unit, the control channel is mapped to the resource block to which the data channel is mapped in the subframe where the data channel is mapped, and the control channel is mapped to a resource block other than resource blocks assigned to data channels of other user apparatuses in a subframe where the data channel is not mapped.

3. The base station as claimed in claim 1, wherein the process unit uses the first pilot channel for measurement, and uses the second pilot channel for demodulation of the data channel.

4. The base station as claimed in claim 1, wherein, in the signal received by the receiving unit, the data channel, the first pilot channel and the second pilot channel are time-division multiplexed.

5. The base station as claimed in claim 1, wherein, in the signal received by the receiving unit, the control channel is mapped to one resource block or to several resource blocks.

6. A receiving method for use in a base station in a mobile communication system in which a single carrier scheme is adopted in uplink and a system band is divided by a plurality of resource blocks, the receiving method comprising the steps of:
receiving a signal that includes a data channel, a first pilot channel that is not related to the data channel, a second pilot channel that is related to the data channel, and a control channel; and
processing the data channel, the first pilot channel, the second pilot channel and the control channel that are included in the received signal,
wherein, in the signal received by the receiving unit, the first pilot channel is mapped to a plurality of resource blocks, and the second pilot channel is mapped to a resource block the same as a resource block to which the data channel is mapped, and the control channel is mapped to the resource block to which the data channel is mapped when the control channel and the data channel are mapped to the same subframe and the control channel is mapped to distributed resource blocks when the control channel and the data channel are not mapped to the same subframe.

7. The receiving method as claimed in claim 6, wherein, in the signal received in the step of receiving, the control channel is mapped to the resource block to which the data channel is mapped in the subframe where the data channel is mapped, and the control channel is mapped to a resource block other than resource blocks assigned to data channels of other user apparatuses in a subframe where the data channel is not mapped.

8. The receiving method as claimed in claim 6, wherein the step of processing uses the first pilot channel for measurement, and uses the second pilot channel for demodulation of the data channel.

9. The receiving method as claimed in claim 6, wherein, in the signal received in the step of receiving, the data channel, the first pilot channel and the second pilot channel are time-division multiplexed.

10. The receiving method as claimed in claim 6, wherein, in the signal received in the step of receiving, the control channel is mapped to one resource block or to several resource blocks.

* * * * *